United States Patent [19]

Riew et al.

[11] 4,107,116
[45] * Aug. 15, 1978

[54] EPOXY RESIN PLASTICS

[75] Inventors: Changkiu Keith Riew, Akron; Alan R. Siebert, Maple Heights; Eugene H. Rowe, Akron, all of Ohio

[73] Assignee: The B. F. Goodrich Company, Akron, Ohio

[*] Notice: The portion of the term of this patent subsequent to Jun. 29, 1993, has been disclaimed.

[21] Appl. No.: 699,218

[22] Filed: Jun. 24, 1976

Related U.S. Application Data

[63] Continuation-in-part of Ser. No. 210,156, Dec. 20, 1971, Pat. No. 3,966,837.

[51] Int. Cl.$^2$ .................... C08L 91/00; C08L 63/02; C08L 63/10
[52] U.S. Cl. .......................... 260/23 EP; 260/23.7 R; 260/836; 260/837 R
[58] Field of Search .................. 260/836, 837, 23.7 R, 260/23 EP

[56] References Cited

U.S. PATENT DOCUMENTS

| | | | |
|---|---|---|---|
| 3,678,130 | 7/1972 | Klapprott et al. | 260/837 R |
| 3,678,131 | 7/1972 | Klapprott et al. | 260/837 R |
| 3,770,698 | 11/1973 | Riew | 260/837 R X |
| 3,792,011 | 2/1974 | Smith et al. | 260/47 EA |

FOREIGN PATENT DOCUMENTS 1,150,520 6/1963 Fed. Rep. of Germany.

*Primary Examiner*—Walter C. Danison
*Attorney, Agent, or Firm*—James R. Lindsay

[57] ABSTRACT

Hard and strong epoxy resin products of high impact resistance are made from a di-epoxy compound, a smaller than equivalent proportion of a dicarboxylic acid which functions as a chain extender, and a bifunctional liquid elastomer, together with a curing agent active at elevated temperatures. Preferably the quantity of bifunctional liquid elastomer is about 5 to 10% of the amount of the di-epoxy compound.

7 Claims, No Drawings

EPOXY RESIN PLASTICS

CROSS REFERENCE TO RELATED APPLICATIONS

This is a continuation in part of application Ser. No. 210,156 filed Dec. 20, 1971, now U.S. Pat. No. 3,966,837. Certain of the functionally terminated elastomers used in this invention are disclosed in the patent of Riew No. 3,770,698 dated Nov. 6, 1973, entitled "Phenol Terminated Elastomers".

BACKGROUND OF THE INVENTION

Epoxy resins have been widely used for many years in making solid products, including molding compositions and fiber reinforced structural plastics, and also casting or potting compositions, as well as coatings and adhesives. Epoxy resins are particularly advantageous because they are easily converted from liquid or pasty or thermoplastic initial materials into strong and chemically resistant thermoset products, with minimum shrinkage and without evolution of volatile materials. Nevertheless, such compositions tend to be brittle when they are sufficiently cross-linked to exhibit a desirably high heat distortion temperature, and previous attempts to diminish the brittleness and produce a high impact resistance by the usual means, such as introduction of plasticizers or flexibilizers, have not been completely satisfactory because other desirable properties, such as strength, have been sacrificed. Accordingly, an object of this invention is production of thermoset epoxy resin compositions which are not brittle but have a high resistance to impact and crack propagation without reduction of strength.

SUMMARY OF THE INVENTION

In this invention, a di-epoxy compound is combined with a dicarboxylic acid which functions as a chain extender, a cross-linking agent, and preferably about 5% and 10% (based on the weight of the di-epoxy compound) of a functionally terminated elastomer. When heated for the proper time, such a combination sets up to a strong and rigid product which exhibits a very high resistance to impact and crack propagation. When the elastomer quantity is limited as stated above, these benefits are obtained without loss of strength or modulus.

The epoxy constituent should contain two terminal epoxy groups as the principal reactive groups. Many such materials are known, including di-epoxy ethers of diphenols such as the diglycidyl ether of bisphenol A, di-epoxy esters of dicarboxylic acids such as diglycidyl adipate, and di-epoxy derivatives of dienes such as butadiene dioxide or vinyl cyclohexene dioxide. Many others are disclosed in various publications, such as the "Handbook of Epoxy Resins" by Lee and Neville, McGraw-Hill Book Co., New York, 1967. It is preferred that the epoxy constituent contain no more than two epoxy groups, since a greater number of reactive groups in a single constituent might result in premature cross-linking, which is undesirable in this invention.

The chain extender may be any of the dicarboxylic acids which are known to be sufficiently reactive to be capable of reacting with epoxy compounds at temperatures substantially above room temperature, and are essentially free from groups other than carboxyl groups which will react with epoxy compounds. For example, such typical aliphatic dicarboxylic acids as glutaric acid, adipic acid, pimelic acid, suberic acid, azelaic acid, and sebacic acid are easily obtainable and are suitable. The alicyclic compounds such as 1.2 cyclohexane dicarboxylic acid and 1.4 cyclohexane dicarboxylic acid are also suitable. Dimer fatty acids, such as the dimer of linoleic acid, have the special advantage of being liquid and dissolving more readily in the mix than the crystalline dicarboxylic acids. Furthermore, aromatic dicarboxylic acids may be used, such as phthalic acid, isophthalic acid, and terephthalic acid, as well as biphenyl diacids such as diphenic acid, and several naphthalene dicarboxylic acids. Unsaturated dicarboxylic acids such as maleic and fumaric acids may be used, but preferably under conditions such that their reaction is primarily on the carboxyl groups and not at the double bonded carbons. Moreover, ether acids such as dicarboxy diphenyl ether may be used. Aliphatic hydroxy dicarboxylic acids such as malic acid and tartaric acid can be used if conditions are such that the hydroxyls are relatively unreactive. Tricarboxylic acids, however, are not preferred, as they will induce premature cross-linking.

The cross-linking agents, sometimes called catalysts or curing agents, are the materials which, either by direct reaction or indirectly by preliminary decomposition followed by a reaction, are capable of attacking residual functional groups at reasonably elevated temperatures to connect the polymer chains and produce an adequately cross-linked and, therefore, satisfactorily thermoset final product. A great many materials known to be hardening or cross-linking agents for epoxy resins are disclosed in the "Handbook of Epoxy Resins" already mentioned. Those presently preferred are tertiary or secondary amines or similar nitrogenous bases such as are sometimes designated "Lewis bases", or their salts, including such widely used materials as tris (dimethylaminomethyl) phenol, piperidine, dicyandiamide, triethylene tetramine, and the like.

The functionally terminated elastomer may be any of a great many types of linear polymers having a backbone of such a character that it is more or less rubbery or elastomeric at the intended temperature of service of the product, with each chain molecule containing two, or at most, a small number of, groups reactive with epoxy groups. This elastomer constituent is preferably one which is compatible with, that is, soluble in, the particular type of epoxy material selected, in its unreacted condition, but having only a limited solubility in the reaction product of the di-epoxy compound with the chain extender, so that it will separate as minute particles or domains of a separate phase. In addition, it is desirable that the reactive end groups of the elastomer have a reactivity toward epoxy groups not greater than the reactivity of the chain extender. Moreover, for maximum strength and hardness, the proportion of elastomer should be small, and preferably about 5% based on the weight of the diepoxy compound, so that it will not significantly decrease the strength or modulus of the matrix material. However, as little as 2½% will give good results, and as much as 7½% may be used without significant loss of strength of the product. As much as 10 or even 20 parts may be used for coatings or adhesives which do not need to exhibit a maximum hardness and rigidity.

Such elastomers include functionally terminated chain polymers of various kinds, including polymers of dienes such as butadiene, chlorobutadiene, or isoprene; copolymers of dienes with each other or with ethylenically unsaturated compounds, such as copolymers of butadiene with styrene, acrylonitrile, or ethyl acrylate;

butyl rubber; ethylene-propylene rubber; polymers of epichlorohydrin or other polyether elastomers; elastomeric polysilicones; elastomeric polyamides or polyamines; and the like, in each case with a small number, preferably two, functionally reactive groups, which are preferably the terminal groups of the chain molecule.

Suitable functionally terminated elastomers include those having hydroxyl, mercapto, carboxyl, or amino groups, preferably carboxyl or phenolic hydroxyl, at or near the ends of the chain molecules. Such materials include amine terminated polyamides, such as nylon finished by reaction with a small excess of a diamine; functionally terminated polyethers such as primary amine terminated poly-tetramethylene-oxide or poly-epichlorohydrin or poly-ethylene oxide; mercapto terminated alkyl acrylate polymers such as copolymers of ethyl acrylate with a little butyl acrylate; carboxyl terminated liquid polymers or copolymers of butadiene or other dienes; and the like.

Although best results have been obtained with elastomeric polymers having functional groups as the acutal terminus of both ends of the chain, good results can be obtained with liquid elastomers having pendent functional groups in a very small number, so that at least two of the groups will be reasonably close to the ends of the chain molecule, and additional groups are either absent or very few in number. Various techniques for obtaining pendent functional groups are known. For example, in diene polymers a carefully chosen small proportion of acrylic acid will introduce pendent carboxyl groups into the chain, or acrylonitrile may be similarly added with subsequent hydrolysis of the nitrile groups to carboxyl.

Experience has shown that it is desirable for the reactivity of the functional groups toward epoxy groups to approximate the reactivity of epoxy groups toward one another, so as to assure bonding of the elastomer chains to the final cross-linked epoxy matrix, but only after chain extension has occurred and small particles or domains of elastomer appear as a separate phase. It is presently preferred that the functionally reactive groups be carboxyl or phenolic hydroxyl groups, and if they are either much more or much less reactive than phenolic hydroxyl, to convert them to phenolic hydroxyl or other functional groups of similar reactivity, as will be explained in more detail in the following description.

When the four essential constituents are properly compounded and appropriately heated, it will be found that the initial reaction will tend to be a great increase in molecular weight by reaction of the epoxy compound with the chain extender to produce an intermediate condition in which the material becomes a relatively strong solid at room temperature, but still thermoplastic. This will cause precipitation of the elastomer in the form of small particles of a separate phase imbedded in the matrix of high molecular weight epoxy product. Finally, the cross-linking will convert the matrix of epoxy product to a strong thermoset condition and will also cause the functional end groups of the elastomer to bond the elastomer domains to the epoxy matrix.

Not only should the elastomer component be present in a definitely limited small proportion, as has already been pointed out, but the molecular equivalent proportion of chain extender to the di-epoxy compound should be such that free epoxy groups will always be present in large excess until the setting reaction is essentially completed. This requires that the chain extender be limited to a proportion distinctly less than that equivalent to the di-epoxy compound, and preferably, considerably less than the difference between the number of equivalents of epoxy groups and the number of equivalents of functionally reactive groups in the elastomer. That is, there should be sufficient epoxy material to react with the chain extender, the elastomer, and also the setting agent or hardener.

The foregoing theoretical explanation is confirmed by the observation that the compositions of this invention can undergo a rather far-reaching reaction and change in physical properties without losing their ability to be molded or otherwise shaped to their final form, nor their ability to bond firmly to surfaces of other material when used as coatings or adhesives, and can then be completely converted or set by simply heating at an appropriate temperature for a suitable time. It is also confirmed by the observation that the composition tends to become opaque during the course of the reaction and that particles of a separate phase can be identified by suitable examination of the finished product.

When properly prepared, the products of this invention exhibit a combination of extremely high strength and modulus with an impact and fracture resistance many times greater than was previously attainable. However, these outstanding results are not attainable unless all four of the specified kinds of ingredients are present in the approximate proportions indicated.

As a specific example of one embodiment of the invention, the following materials are used:

Liquid epoxy resin, which is the di-glycidyl ether of bisphenol A, of average molecular weight 380, and an n value of 0.2 meaning that on the average one out of five molecules contains an additional glycidyl and bisphenol A residue, which results in a pendent hydroxyl in the chain molecule. This is a standard commerical material.

Carboxyl terminated liquid copolymer of butadiene and acrylonitrile of average molecular weight about 3200, containing about 18% acrylonitrile. This is a commercial material sold under the name Hycar CTBN and will be designated as CTBN. It can be prepared by polymerization with azo dicyanovaleric acid initiator as described in Siebert U.S. Pat. No. 3,285,949.

Azelaic acid.

Piperidine.

Epoxy compositions are prepared containing these ingredients in the proportions of epoxy compound 100 parts by weight, CTBN 5 parts, azelaic acid from 3.7 to 26 parts and piperidine 5 parts. The first three ingredients are thoroughly mixed at 90° C in a vacuum to prevent entrainment of air bubbles, and the piperidine is then stirred in, also with evacuation. The mix is heated overnight in a shallow pan at 120° C and the hard slab is cut into test pieces. Other specimens are similarly prepared without the CTBN, or with CTBN but without the azelaic acid chain lengthener.

The products are all hard, strong plastics with a tensile strength in the range of 7000 to 8850 psi and elongation at break of about 7 to 10%. Those containing all four ingredients easily withstand sharp hammer blows. By contrast, similar compounds without azelaic acid or withiout the CTBN elastomer have a comparable tensile strength and elongation but shatter under similar hammer blows.

Any of the other simple dicarboxylic acids mentioned above may be substituted for azelaic acid, with appropriate adjustment of quantities to provide conpositions with suitable molar ratios as previously explained.

Moreover, mixtures of different dicarboxylic acids may sometimes be found desirable.

The foregoing example involves use of a liquid diglycidyl ether of bisphenol A since it is the most widely used and convenient epoxy resin material. However, similar results are obtained using diglycidyl ethers of bisphenol A having a higher molecular weight and therefore a longer chain of atoms between the terminal epoxy groups, but since they are solids at room temperature they are more difficult to handle.

Also, other epoxy compounds of various origins can be used in similar ways to replace the diglycidyl ether of bisphenol A, as was previously mentioned.

In addition, there are a great many functionally terminated elastomers which give the same kind of unexpected results in toughening epoxy compounds without reduction of strength and regidity when incorporated with the other ingredients specified herein. Typical materials include amine terminated copolymers of butadiene and acrylonitrile, mercapto terminated copolymers of either butadiene or isoprene and acrylonitrile, carboxyl terminated polybutadiene or carboxyl terminated copolymers of butadiene and styrene or of isoprene and acrylonitrile, hydroxyl terminated copolymers of butadiene and acrylonitrile, carboxyl terminated poly-acrylic esters, mercapto terminated polyacrylic esters, functionally terminated polyethers such as amine terminated poly-tetramethylene-oxide or polyepichlorohydrin or polyethylene oxide, all of which can be incorporated into epoxy compositions of the kinds described with the same good results.

While it is not possible to explain fully why the particular type of combination specified above should give the unexpected results in toughening of epoxy resins without the expected loss of strength and rigidity, it is believed to be dependent on appearance of particles or domains of a separate phase of elastomeric material in very small dimensions and in a critically small proportion to the total volume of matrix material, and also to be dependent on bonding of the separate phase to the matrix material.

Thus, replacement of the functionally terminated elastomers of this invention with ordinary elastomers having the same kind of backbone structure but not capable of bonding to epoxy compositions does not give this kind of improvement.

The mixture of the principal ingredients in liquid or molten form is believed to be important in assuring initial distribution of the several ingredients uniformly throughout the mass. The presence of substantial proportions of a dicarboxylic acid or other chain lengthening material is believed to be important in changing solubility relationships so that the elastomer can separate during the early part of the hardening reaction as a separate phase in a very small particles distributed throughout the mass. The final cross-linking then completes the hardening and sets the epoxy matrix and assures firm bonding of the elastomer particles to the matrix.

The improvements of this invention are not simply flexibilizing. Flexibilizing is accomplished by physical addition of liquid or elastomeric materials, and reduces the strength and the modulus of the product, and therefore diminishes the value of products for many purposes where rigidity or maintenance of dimensions is important. Here a many-fold improvement in toughness is achieved unexpectedly with essentially no reduction and sometimes even an increase in strength and stiffness, by a chemical bonding of a functionally terminated elastomer with the thermoset matrix.

We claim:

1. An epoxy resin composition yielding high strength, high modulus, high impact resistant, thermoset products, comprising a di-epoxy compound, a dicarboxylic acid functioning as a chain lengthening material, a curing agent for the epoxy compound, and a liquid elastomer with terminal functional groups reactive with epoxy groups and essentially free from other functional groups reactive with epoxy groups, the elastomer being not over about 10% of the weight of the di-epoxy compound, and the sum of the chemically equivalent quantities of the dicarboxylic acid, the functionally terminated liquid elastomer, and the curing agent, being less than the chemically equivalent quantity of the di-epoxy compound.

2. A composition as in claim 1 in which the chain lengthening material is a dicarboxyl substituted aliphatic hydrocarbon.

3. A composition as in claim 1 in which the elastomer is present in an amount of 2½% to 7½% by weight of the di-epoxy compound.

4. A composition as in claim 3 in which the chain lengthening material is a dicarboxyl substituted aliphatic hydrocarbon.

5. A composition as in claim 4 in which the dicarboxy substituted aliphatic hydrocarbon is a dimer of an unsaturated fatty acid.

6. A thermoset product made from the composition of claim 1.

7. A thermoset product made from the composition of claim 4.

* * * * *